US009965674B2

(12) United States Patent
Long et al.

(10) Patent No.: US 9,965,674 B2
(45) Date of Patent: May 8, 2018

(54) TICKET EVADING DECISION SYSTEM WITH HUMAN FACE RECOGNITION AND USAGE METHOD THEREOF

(71) Applicant: Protruly Vision Technology Group CO., LTD, Nanjing (CN)

(72) Inventors: Gang Long, Nanjing (CN); Songwei Lin, Nanjing (CN)

( * ) Notice: Subject to any disclaimer, the term of this patent is extended or adjusted under 35 U.S.C. 154(b) by 122 days.

(21) Appl. No.: 14/886,096

(22) Filed: Oct. 19, 2015

(65) Prior Publication Data

US 2016/0321497 A1 Nov. 3, 2016

(30) Foreign Application Priority Data

Apr. 29, 2015 (CN) .......................... 2015 1 0210898

(51) Int. Cl.
G06K 9/00 (2006.01)
G06Q 10/10 (2012.01)
G06Q 30/02 (2012.01)
G06Q 50/00 (2012.01)
H04N 5/33 (2006.01)

(52) U.S. Cl.
CPC ..... *G06K 9/00288* (2013.01); *G06K 9/00268* (2013.01); *G06Q 10/10* (2013.01); *G06Q 30/02* (2013.01); *G06Q 50/00* (2013.01); *H04N 5/33* (2013.01); *G06K 2009/00328* (2013.01)

(58) Field of Classification Search
None
See application file for complete search history.

(56) References Cited

U.S. PATENT DOCUMENTS

| 2006/0268300 A1* | 11/2006 | Suzuki ................... H04N 7/141 358/1.9 |
| 2009/0232361 A1* | 9/2009 | Miller ................ G06K 9/00892 382/115 |
| 2009/0324069 A1* | 12/2009 | Kawai ..................... G06T 5/008 382/165 |

(Continued)

*Primary Examiner* — Randolph I Chu
(74) *Attorney, Agent, or Firm* — Wayne & King LLC

(57) ABSTRACT

The present invention discloses a ticket evading decision system with human face recognition and usage method thereof. The ticket evading decision system comprises a human face information collecting module, an information storing module, a ticket counting module and a ticket evading decision module, wherein the human face information collecting module, the ticket counting module and the ticket evading decision module are connected with the information storing module; the human face information collecting module scans and collects human face feature information and converts and compresses the same; the information storing module integrates the collected human face feature information into a complete record and stores the same; the ticket counting module computes and counts thrown fare data in real time and stores or updates the currently thrown ticket data and state into the information storing module; and the ticket evading decision module retrieves and processes each record stored in the information storing module in real time, and performs analysis, decision and timing processing according to the state of the record. The present invention provides a solution with good compatibility, high efficiency, high automation degree and low cost for a ticket evading scene.

1 Claim, 2 Drawing Sheets

(56) References Cited

U.S. PATENT DOCUMENTS

2011/0313821 A1* 12/2011 Hilton ................... G07C 11/00
                                                                705/13
2016/0227259 A1*  8/2016 Brav .................. H04N 5/23206

* cited by examiner

TICKET EVADING DECISION SYSTEM WITH HUMAN FACE RECOGNITION AND USAGE METHOD THEREOF

CROSS-REFERENCE TO RELATED APPLICATIONS

This application is a continuation in part of, and claims priority to, Chinese Patent Application No. 201510210898.X with a filing date of Apr. 29, 2015. The content of the aforementioned application, including any intervening amendments thereto, is incorporated herein by reference.

TECHNICAL FIELD

The present invention relates to the technical field of human face recognition, in particular to a ticket evading decision system with human face recognition and usage method thereof.

BACKGROUND OF THE PRESENT INVENTION

With the rapid development of the technology and the continuous extension of the traffic network, the convenient traffic brings convenience and quickness for people and also brings some problems, such as the behaviors of ticket evading, travel beyond destination station, etc. At present, there is no good technology to process such problems, mainly relying on manual description mode.

The traffic network in a modern city extends in all directions and the traffic mode is very convenient, including metros, public buses, etc. Moreover, the charging mode of the public transportation is gradually automated and intelligentized. Thus, in traffic systems with higher and higher automation, the effective prevention of the behaviors of ticket evading and the like becomes a problem to be solved urgently.

SUMMARY OF THE PRESENT INVENTION

The purpose of the present invention provide a ticket evading decision system with human face recognition having high automation degree and low cost and usage method thereof, so as to solve the problem proposed in the above-mentioned background.

To achieve the above-mentioned purpose the present invention provides the following technical solution:

A ticket evading decision system with human face recognition comprises a human face information collecting module, an information storing module, a ticket counting module and a ticket evading decision module, wherein the human face information collecting module, the ticket counting module and the ticket evading decision module are connected with the information storing module; the human face information collecting module scans and collects human face feature information and converts and compresses the collected human face feature information; the information storing module integrates the collected human face feature information into a complete record and stores the same; the ticket counting module computes and counts thrown fare data in real time and stores or updates the currently thrown ticket data and state into the information storing module; and the ticket evading decision module retrieves and processes each record stored in the information storing module in real time, performs analysis, decision and timing processing according to the state of the record, and performs a corresponding prompt or warning according to a decided result.

As a further solution of the present invention: the conversion and compressing processing comprise digitization of feature data, coding and compressing of image data, formation of a unique digital ID by performing a digest algorithm on the digital data, gray-scale processing of an image, H264 coding and MPEG coding processing.

As a further solution of the present invention: the human face information collecting module uses a camera or infrared imaging equipment to collect the human face feature information.

As a further solution of the present invention: the human face feature information comprises eyes, ears, a human face outline and retinas.

As another further solution of the present invention: the data field of the record integrated by the collected human face feature information stored in said information storing module comprises one or more of data fields of a number, a digital ID, original digital data, thrown money, whether or not the thrown money is enough, recording time and wait timeout.

A usage method of the ticket evading decision system with human face recognition comprises the specific steps as follows:

1) when a person enters a certain scene or gate, collecting the human face feature information at this moment by the human face information collecting module, processing the collected human face feature information data and original image data, obtaining original digital data, and converting the same into a small unique digital ID through a digest algorithm;

2) retrieving the digital ID in all records of the information storing module; if the digital ID does not exist after retrieval, creating a group of new records and initializing the data fields in the records; otherwise, marking the records as current operating records;

3) storing the current new records or updating the existing records into the information storing module; if the records are the new records, the storage position is next to the back of the previous group of records; otherwise, only performing the update operation;

4) counting the currently thrown money by the ticket counting module, updating the thrown money into the current record and storing the same into the information storing module;

5) retrieving and processing all the record data stored into the information storing module in sequence one by one, firstly obtaining the values of all the data fields in the first record; if the state of the record shows that no enough money is thrown or the thrown money is zero, judging that the ticket throwing is abnormal and entering step 6); otherwise, judging that the ticket throwing is normal and entering step 8);

6) when the timeout data field in the current record starts to time, if timing to 10 min or predetermined time threshold, entering step 7); otherwise, continuing to time and entering step 8);

7) if the ticket throwing is abnormal and the time threshold is reached, judging that it is a ticket evading behavior and performing voice reminding or displaying information in an image to perform reminding or warning;

8) continuing to retrieve the next record; if the last record is retrieved, retrieving again from the first record and entering step 5); and performing real-time retrieval and processing by using a multitask system;

9) when a person leaves said scene or quits the gate, collecting the human face feature information at this moment by the human face information collecting module, performing fuzzy matching according to said human face feature information or/and converting the human face feature information into a digital ID, performing retrieval in all the records, and deleting the retrieved records;

10) for the person who has entered said scene or gate, after obtaining the reminding or warning, if ticket supplementing operation is performed, entering step 1) and recomputing and updating the state corresponding to the person in the record.

Compared with the prior art, the present invention has the beneficial effects that:

The present invention provides a solution with good compatibility, high efficiency, high automation degree and low cost for a ticket evading scene.

In the figures: 2—human face information collecting module; 3—information storing module; 4—ticket counting module; and 5—ticket evading decision module.

DETAILED DESCRIPTION OF THE PRESENT INVENTION

The technical solution of the present patent will be further described in detail as below with the combination of the specific embodiments.

Figure 1:
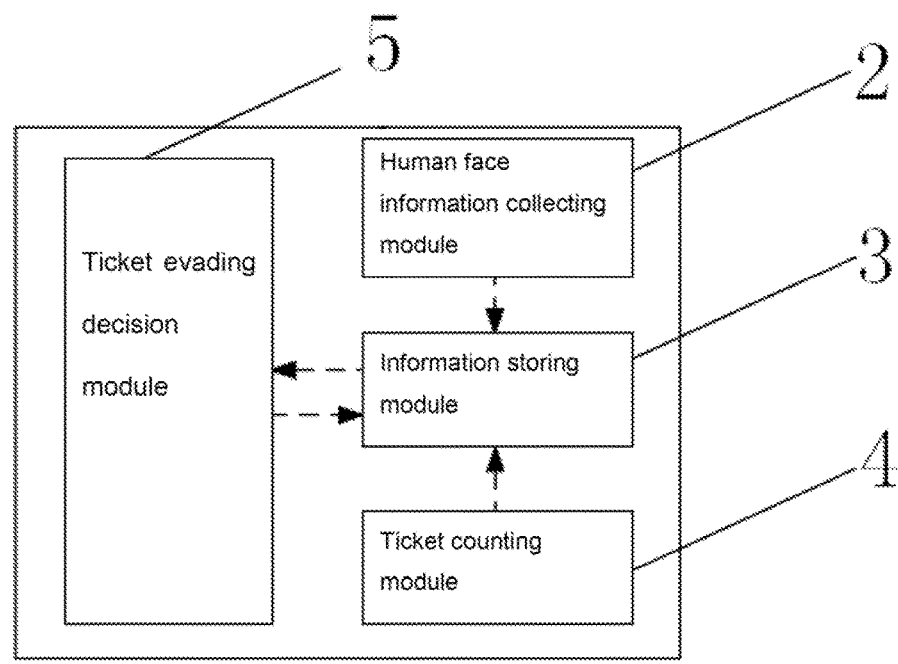
FIG. 1 is a structural diagram of the present invention.
Figure 2:
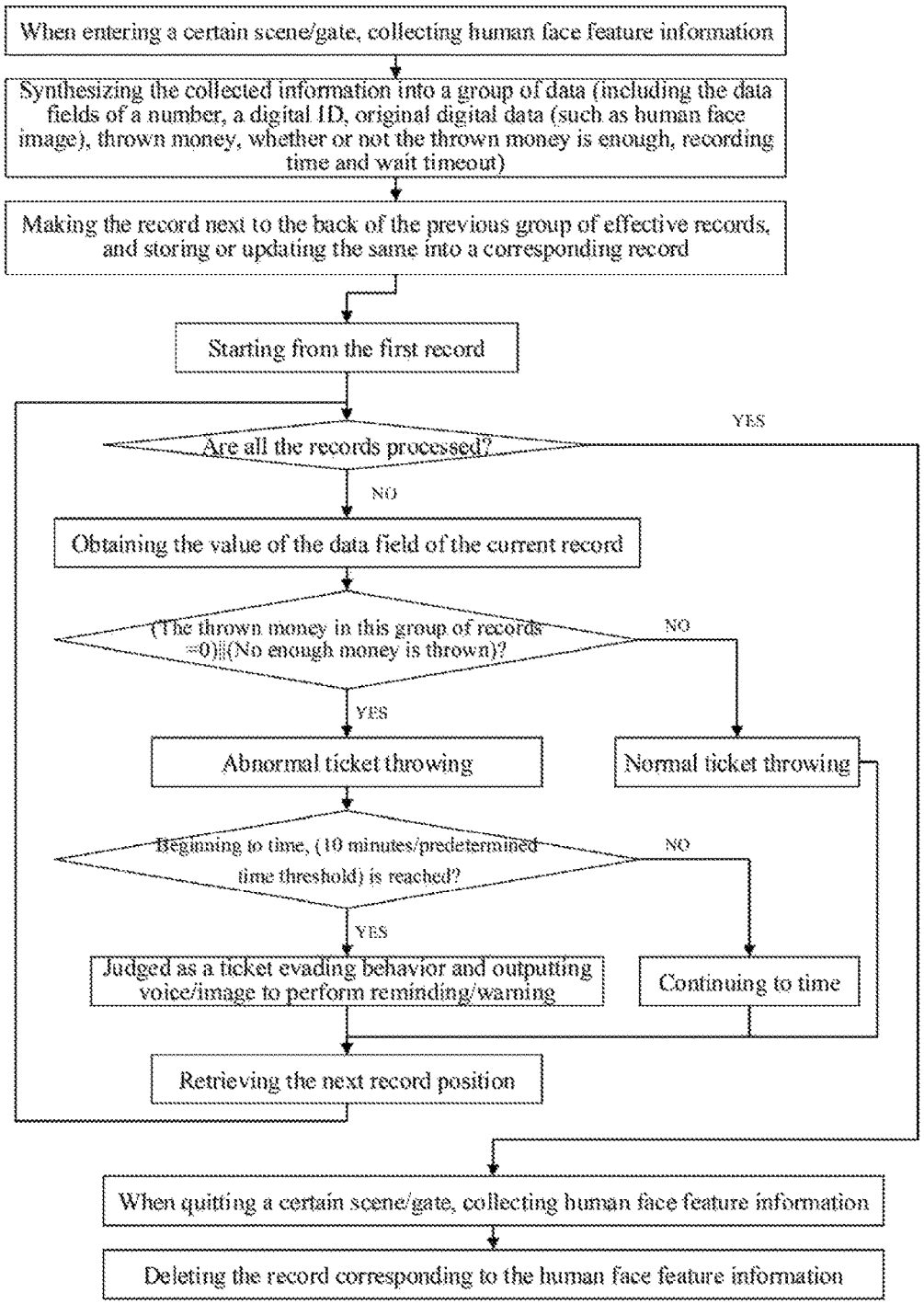
FIG. 2 is a flow diagram of a usage method of the present invention.

Please with reference to FIG. 1 to FIG. 2, a ticket evading decision system with human face recognition comprises a human face information collecting module 2, an information storing module 3, a ticket counting module 4 and a ticket evading decision module 5, wherein the human face information collecting module 2, the ticket counting module 4 and the ticket evading decision module 5 are connected with the information storing module 3; the human face information collecting module 2 scans and collects the human face feature information, converts and compresses the collected human face feature information and original image data, and converts the same into a unique smaller feature digital ID; and the conversion and compressing processing comprise digitization of feature data, coding and compressing of image data, formation of a unique digital ID by performing a digest algorithm on the digital data, gray-scale processing of an image, H264 coding and MPEG coding processing. The human face information collecting module 2 uses a camera or infrared imaging equipment to collect the human face feature information. The human face feature information comprises eyes, ears, a human face outline and retinas. The collection mode is a mode of a human face image. The information storing module 3 integrates the collected human face feature information into a complete record and stores the same; and the data field of the record integrated by the collected human face feature information stored in the information storing module 3 comprises one or more of data fields of a number, a digital ID, original digital data, thrown money, whether or not the thrown money is enough, recording time and wait timeout. When a person enters a certain scene or gate, a new record is stored or the existing record is updated; when the person quits or leaves the scene or gate, the data record corresponding to the person is deleted; and when the person performs ticket supplementing, the record corresponding to the person is updated. The ticket counting module 4 computes and counts thrown fare data in real time and stores or updates the currently thrown ticket data and state into the information storing module 3; and the ticket evading decision module 5 retrieves and processes each record stored in the information storing module 3 in real time, performs analysis, decision and timing processing according to the state of the record, and performs a corresponding prompt or warning according to a decided result. The prompting or warning method is voice prompt or display of a face picture of the person onto a display screen; and if the state of a corresponding record that a ticket is supplemented is updated to be normal, no prompt or warning is performed.

A usage method of the ticket evading decision system with human face recognition comprises the specific steps as follows:

1) when a person enters a certain scene or gate, collecting the human face feature information at this moment by the human face information collecting module 2, processing the collected human face feature information data and original image data, obtaining original digital data, and converting the original large digital data into a small unique digital ID through a digest algorithm in order to facilitate the retrieval;

2) retrieving the digital ID in all records of the information storing module 3; if the digital ID does not exist after retrieval, creating a group of new records and initializing the data fields in the records; otherwise, marking the records as current operating records;

3) storing the current new records or updating the existing records into the information storing module 3; if the records are the new records, the storage position is next to the back of the previous group of records; otherwise, only performing the update operation;

4) counting the currently thrown money by the ticket counting module 4, updating the thrown money into the current record and storing the same into the information storing module 3;

5) retrieving and processing all the record data stored into the information storing module 3 in sequence one by one; if the last of all the records is processed processing the first record again; circling like this; starting to process the first record when processing for the first time; firstly obtaining the values of all the data fields in the first record; if the state of the record shows that no enough money is thrown or the thrown money is zero, judging that the ticket throwing is abnormal and entering step 6); otherwise, judging that the ticket throwing is normal and entering step 8); or deleting the record of normal ticket throwing so as to accelerate retrieval and processing speed;

6) when the timeout data field in the current record starts to time, if timing to 10 min or predetermined time threshold, entering step 7); otherwise, continuing to time and entering step 8);

7) if the ticket throwing is abnormal and the time threshold is reached, judging that it is a ticket evading behavior and performing voice reminding or displaying information in an image to perform reminding or warning;

8) continuing to retrieve the next record; if the last record is retrieved, retrieving again from the first record and entering step 5); and performing real-time retrieval and processing by using a multitask system;

9) when a person leaves the scene or quits the gate, collecting the human face feature information at this moment by the human face information collecting module 2, performing fuzzy matching according to the human face feature information or/and converting, the human face feature information into a digital ID, performing retrieval in all the records, and deleting the retrieved records;

10) for the person who has entered the scene or gate, after obtaining the reminding or warning, if ticket supplementing operation is performed, entering step 1) and recomputing and updating the state corresponding to the person in the record. In the next round of decision, because the record state of the person is that enough money is thrown, reminding or warning is not performed.

The entire process of the usage method of the ticket evading decision system with human face recognition is processed according to step 1) to step 10), wherein step 5) to step 8) perform circular processing on one task. The event-driven mode is used for information collecting and ticket counting, namely collecting and ticket counting are driven when a certain person performs a ticket throwing behavior; otherwise, collecting and ticket counting are not performed.

When many persons simultaneously enter a certain scene or gate and the last person performs overall ticket throwing, the ticket counting module 4 binds the record information of many persons, makes calculation according to the thrown amount, and simultaneously updates the bound records; for example, when three persons simultaneously enter, each person is required to throw two tickets, the first two persons do not throw the tickets and the last person throws six tickets, three groups of records corresponding to the three persons are bound and the retrieval is performed according to the human face feature of the last person; according to the throwing amount of six tickets, the records bound together are simultaneously updated as that enough money is thrown; if the last person only throws four tickets, the last two records in the three records bound together are only updated as that enough money is thrown and the first record is that zero ticket is thrown, and so one for other conditions.

The usage method of the ticket evading decision system with human face recognition adopts a multitask system; the ticket evading decision module 5 uses an independent task to perform real-time processing; and the human face information collecting module 2, the ticket counting module 4 and the information storing module 3 adopt an event-driven mode to process, so that the real-time performance and high efficiency can be better experienced.

The present invention provides a solution with good compatibility, high efficiency, high automation degree and low cost for a ticket evading scene.

The better embodiments of the present patent are described in detail above, but the present patent is not limited to the above-mentioned embodiments. Various modifications can be made by those skilled in the art within their knowledge scope without departing from the spirit of the present patent.

We claim:

1. A usage method of a ticket evading decision system with human face recognition, wherein the ticket evading decision system comprise a human face information collecting module (2), an information storing module (3), a ticket counting module (4) and a ticket evading decision module (5); said human face information collecting module (2), the ticket counting module (4) and the ticket evading decision module (5) are directly connected with the information storing module (3), respectively; said human face information collecting module (2) scans and collects human face feature information and converts and compresses the collected human face feature information into a small unique digital ID; said information storing module (3) integrates the small unique digital ID into a complete record and stores the record; said ticket counting module (4) computes and counts thrown fare data in real time and stores or updates the currently thrown ticket data and state into the information storing module (3); and said ticket evading decision module (5) retrieves and processes each record stored in the information storing module (3) in real time, performs analysis, decision and timing processing according to the state of the record, and performs a corresponding prompt or warning according to a decided result; and wherein, the usage method comprises the specific steps as follows:
1) when a person enters a certain scene or gate, collecting the human face feature information at this moment by the human face information collecting module (2), processing the collected human face feature information data and original image data, obtaining original digital data, and converting the digital data into a small unique digital ID through a digest algorithm;
2) retrieving said digital ID in all records of the information storing module (3); if said digital ID does not exist after retrieval, creating a group of new records and initializing the data fields in said records; otherwise, marking said records as current operating records;
3) storing the current new records or updating the existing records into the information storing module (3); if the records are the new records, the storage position is next to the back of the previous group of records; otherwise, only performing the update operation;
4) counting the currently thrown money by the ticket counting module (4), updating the thrown money into the current record and storing the current record into the information storing module (3);
5) retrieving and processing all the record data stored into the information storing module (3) insequence one by one; firstly obtaining the values of all the data fields in the first record; if the state of the record shows that no enough money is thrown or the thrown money is zero, judging that the ticket throwing is abnormal and enter-ing step 6); otherwise, judging that the ticket throwing is normal and entering step 8);
6) when the timeout data field in the current record starts to time, if timing to 10 min or predetermined time threshold, entering step 7); otherwise, continuing to time and entering step 8);
7) if the ticket throwing is abnormal and the time threshold is reached, judging that it is a ticket evading behavior and performing voice reminding or displaying information in an image to perform reminding or warning;
8) continuing to retrieve the next record; if the last record is retrieved, retrieving again from the first record and entering step 5); and performing real-time retrieval anti processing by using a multitask system;
9) when a person leaves said scene or quits the gate, collecting the human face feature information at this moment by the human face in collecting module (2), performing fuzzy matching according to said human face feature information and/or converting said human face feature information into a digital ID, performing retrieval in all the records, and deleting the retrieved records;
10) for the person who has entered said scene or gate, after obtaining the reminding or warning, if ticket supple-menting operation is performed, entering step 1) and recomputing and updating the state corresponding to said person in the record.

\* \* \* \* \*